United States Patent
Herve et al.

(10) Patent No.: US 6,720,549 B1
(45) Date of Patent: Apr. 13, 2004

(54) DEVICE FOR CONTROLLING AN OPTICAL SIGNAL MODULATION FREQUENCY, AND IN PARTICULAR FOR CONTROLLING MICROWAVE OR MILLIMETRIC MODULATION FREQUENCY

(75) Inventors: Didier Herve, Saint Renant (FR); René Coquille, Lannion (FR); Jean-François Cadiou, Trébeurden (FR)

(73) Assignee: France Telecom, Paris (FR)

( * ) Notice: Subject to any disclaimer, the term of this patent is extended or adjusted under 35 U.S.C. 154(b) by 71 days.

(21) Appl. No.: 10/111,035
(22) PCT Filed: Oct. 20, 2000
(86) PCT No.: PCT/FR00/02921
§ 371 (c)(1),
(2), (4) Date: Jul. 19, 2002
(87) PCT Pub. No.: WO01/29610
PCT Pub. Date: Apr. 26, 2001

(30) Foreign Application Priority Data

Oct. 21, 1999 (FR) .............................................. 99 13131

(51) Int. Cl.⁷ .............................. G03H 1/10; G01J 1/04
(52) U.S. Cl. ........................ 250/227.11; 359/10; 359/22
(58) Field of Search ...................... 250/227.11, 227.18, 250/227.23, 226, 227.27, 550; 359/7, 10, 11, 22, 3, 24, 246, 278; 372/32

(56) References Cited

U.S. PATENT DOCUMENTS

| 4,761,059 A | * | 8/1988 | Yeh et al. ..................... 359/299 |
| 5,777,760 A | * | 7/1998 | Hays et al. ..................... 359/7 |

* cited by examiner

Primary Examiner—Kevin Pyo
(74) Attorney, Agent, or Firm—Blakely, Sokoloff, Taylor & Zafman

(57) ABSTRACT

A device for monitoring a modulation frequency of an optical signal,—in particular a device for monitoring the modulation frequency of an optical signal modulated at a microwave or millimetric frequency—, the device being characterized in that it comprises a photorefractive crystal (7), a photodetector (6), and means (8a, 8b, 8c; 9a, 9b, 9c) for applying to said crystal (7) firstly at least a fraction of the modulated optical signal and secondly a write optical signal for photoinducing a Bragg grating on said crystal (7), the orientations of the modulated optical signal and of the write optical signal relative to said crystal (7) being such that at a given wavelength of the optical signal the photodetector (6) detects an intensity for the signal reflected by the crystal (7) that reaches a maximum when the optical signal is modulated at the modulation frequency to be detected.

10 Claims, 2 Drawing Sheets

DEVICE FOR CONTROLLING AN OPTICAL SIGNAL MODULATION FREQUENCY, AND IN PARTICULAR FOR CONTROLLING MICROWAVE OR MILLIMETRIC MODULATION FREQUENCY

The present invention relates to a device for monitoring a modulation frequency of an optical signal, and in particular a device for monitoring a microwave or millimetric modulation frequency.

Proposals have already been made for hybrid transmission systems using optical fibers to transmit signals which are modulated at frequencies normally used for radio transmissions, i.e. mainly microwave or millimetric frequencies.

In this respect, reference can be made to the following two publications, for example:

J. F. Cadiou, D. Tanguy, E. Penard, P. Jaffré, H. Schmuck, E. Vergnol, D. Mathoorasing, "Hybrid fiber-radio systems in the mm-wave range: A comparison between available optical sources", International Topical Meeting on Microwave Photonics, 5MWP'98, Princeton, N.J., pp. 59–62, 1998; and E. Vergnol, F. Devaux, D. Tanguy, E. Penard, "Integrated lightwave millimetric single-sideband source: Design and issues", Journal of Lightwave Technology, Vol. 16, No. 7, pp. 1276–1284, 1998.

One of the main difficulties encountered with such hybrid systems lies in the need to be able to stabilize over time the oscillator which modulates the optical signal.

Modulation frequency drift must be prevented so as to avoid any interference between the various carriers.

An object of the invention is thus to propose a device making it possible to monitor a modulation frequency of an optical signal, and in particular a microwave or millimetric modulation frequency.

Optical filters with a photorefractive crystal have been known for a long time.

They work on the following principle.

When a correctly-oriented photorefractive crystal has applied thereto firstly a write optical signal at a given wavelength $\lambda_e$ and secondly an optical signal to be filtered, a holographic grating is created on the crystal which reflects the signal to be filtered at a filter wavelength $\lambda_f$ such that:

$$\lambda_f = \lambda_e (1-[\sin(\alpha)/n]^2)^{1/2}$$

where n is the refractive index of the crystal and where $\alpha$ is the angle between the controlling light signal and the optical signal to be filtered.

A photorefractive crystal optical filter of that type is described in particular in the Applicants' French patent application published under the No. 2,739,508.

The invention provides a device for monitoring a modulation frequency of an optical signal—in particular a device for monitoring the modulation frequency of an optical signal modulated at a microwave or millimetric frequency—which device comprises a photorefractive crystal, a photodetector, and means for applying to said crystal firstly at least a fraction of the modulated optical signal and secondly a write optical signal for photoinducing a Bragg grating on said crystal, the orientations of the modulated optical signal and of the write optical signal relative to said crystal being such that at a given wavelength of the optical signal the photodetector detects an intensity for the signal reflected by the crystal that reaches a maximum when the optical signal is modulated at the modulation frequency to be detected.

Advantageously, the device includes means for deriving the write optical signal from the modulated optical signal.

In particular, the write optical signal is preferably a portion of the modulated optical signal.

The invention also provides a device for controlling the frequency of an oscillator whose output signal is used to modulate an optical signal. This device comprises a servo-control loop which comprises:

firstly a monitor device of the above-specified type receiving as input at least a portion of the optical signal modulated by the oscillator; and secondly means for correcting the frequency of the oscillator as a function of the output signal from the photodetector of said monitor device.

The invention also provides a hybrid transmission system comprising emitter means, modulator means for modulating the signal output by the emitter means, an oscillator for generating a microwave or millimetric frequency signal for controlling the modulator means, and an optical fiber line over which the modulated signal is transmitted. This system further comprises a device of the above-specified type for controlling the frequency of the oscillator.

The invention also provides a system for controlling the modulation frequency of an optical signal, characterized in that it comprises two monitor devices of the above-specified type, centered on respective monitoring frequencies on either side of the modulation frequency that the system is to control, and in that it also comprises a differential amplifier on whose inputs the outputs from the photodetectors of the two monitor devices are injected.

The invention also provides a hybrid transmission system comprising emitter means, modulator means for modulating the signal output by the emitter means, an oscillator for generating a microwave or millimetric frequency signal for controlling the modulator means, and an optical fiber line over which the modulated signal is transmitted, the system being characterized in that it further comprises a system of the above-specified type for controlling the frequency of the oscillator.

Other characteristics and advantages of the invention appear further from the following description.

This description is purely illustrative and non-limiting. It should be read with reference to the accompanying drawings, in which.

Figure 1:
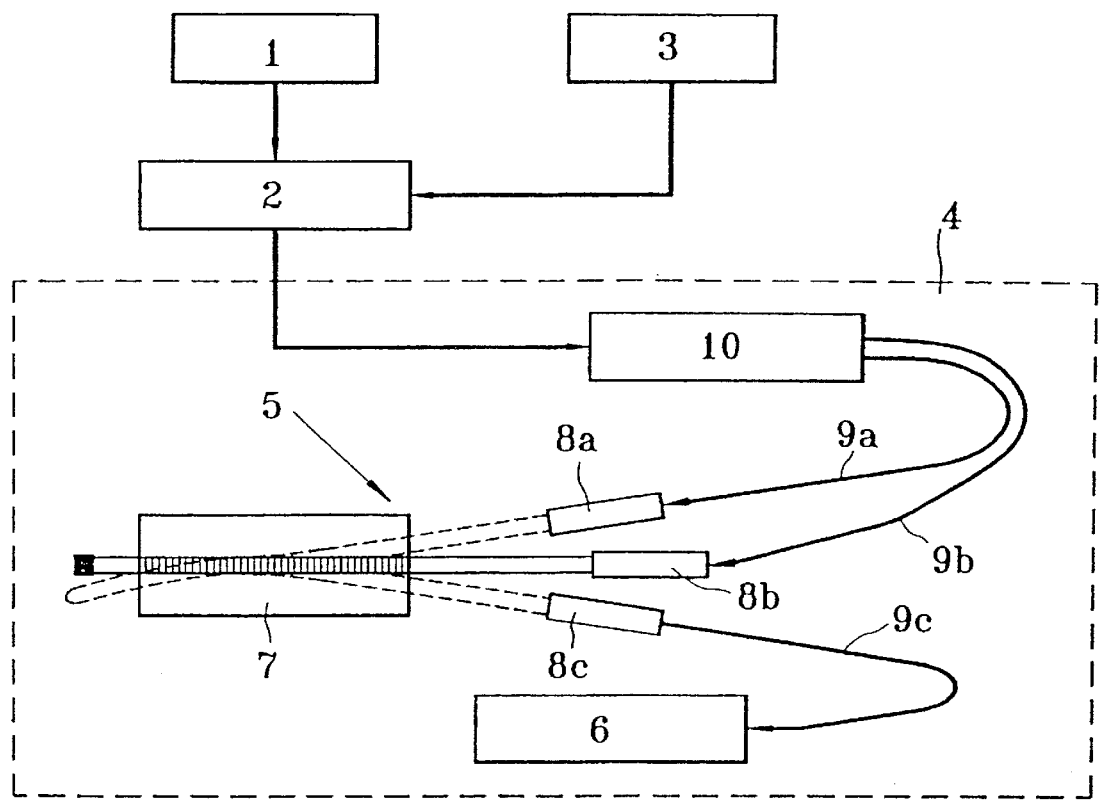
FIG. 1 is a diagram showing the principle of a detector device constituting a particular embodiment of the invention.

FIG. 1 shows a laser diode 1, a modulator 2 which modulates the optical signal output by said diode 1, a frequency generator 3 which controls the modulator 2, and a device 4 for monitoring the modulation frequency of the signal output from the modulator 2.

By way of example, the laser diode can be a diode emitting at a wavelength of 1543 nanometers (nm); the modulator 2 can be a Mach-Zehnder type modulator; and the generator 3 can generate a variable frequency lying in the range 21 gigahertz (GHz) to 27 GHz.

The device 4 has filter means 5 of the photorefractive crystal type and a photodetector 6 having the filtered signal as reflected by said filter means 5 applied thereto.

The filter means 5 are, for example, of the type described in French patent application No. 2,739,508, to which reference can advantageously be made.

They comprise a photorefractive crystal 7 and three fiber collimators 8a, 8b, and 8c which are fixed in position relative to the photorefractive crystal 7 and which are connected respectively to an optical fiber 9a for applying the optical signal for filtering to the crystal 7 (collimator 8a), to an optical fiber 9b which enables the write optical signal to be applied to said crystal (collimator 8b), and an optical fiber 9c whereby the filtered signal as reflected by the crystal is sent to the photodetector 6 (collimator 8c).

Specifically, the write optical signal transmitted by the fiber 9b is the same as the optical signal for filtering as transmitted by the fiber 9a, the monitor device 4 having a coupler 10 which enables the optical signal whose modulation frequency is to be monitored to be coupled into both of the fibers 9a and 9b.

The frequency monitor device 4 thus presents the advantage of requiring no reference light source and also of not requiring any means for splitting the spectrum of the signal for filtering into a plurality of spectrum lines, which would make its structure complex and would make it less flexible in use.

It should be observed that using the light signal whose frequency is to be monitored as the write signal gives rise to at least two holographic Bragg gratings on the crystal 7, but that this does not significantly affect the characteristics of the crystal, in particular in the intended application.

The photorefractive crystal 7 is preferably an irondoped indium phosphide (InP:Fe) crystal. By way of example, this crystal can be 18 millimeters (mm) long, 10 mm wide, and 1 mm thick, and it can have <001> crystallographic orientation.

Naturally, other photorefractive crystals could be envisaged.

Figure 2:
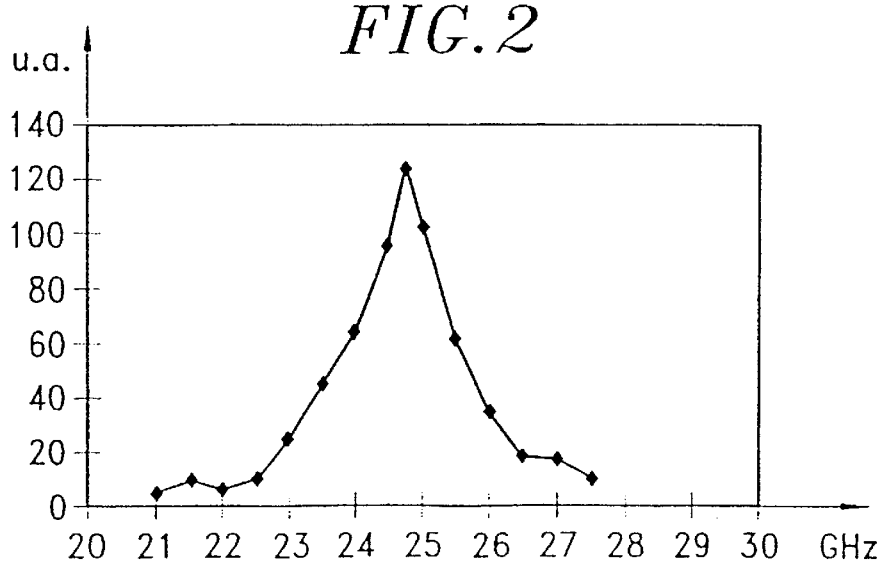
FIG. 2 is a graph showing the appearance of the intensity of the electrical signal output by the photodetector of the FIG. 1 device as a function of the modulation frequency.

For an angle $\alpha$ of 3° both between the collimators 8a and 8b—i.e. between the optical signal to be filtered and the write optical signal—and also between the collimators 8b and 8c—i.e. between the write optical signal and the reflected signal—, the intensity of the electrical signal output by the photodetector 6 as a function of modulation frequency has the appearance shown in FIG. 2.

This intensity has a maximum at a modulation frequency of 24.8 GHz (such modulation generating a wavelength that is offset by 0.2 nm relative to an emission wavelength of 1.55 micrometers ($\mu$m)) and is practically zero at less than 22 GHz and at more than 27 GHz.

Thus, the device 4 makes it possible to achieve particularly selective monitoring over the modulation frequency of an optical signal, the frequency monitored naturally being a function of the angle $\alpha$ between the portion of the signal which is used as the write optical signal and the portion of the signal which acts as the optical signal for filtering.

Nevertheless, it should be observed that the angle between the collimators 8b and 8c does not need to be fixed with the same high precision as the angle between the collimators 8a and 8b.

Figure 3:
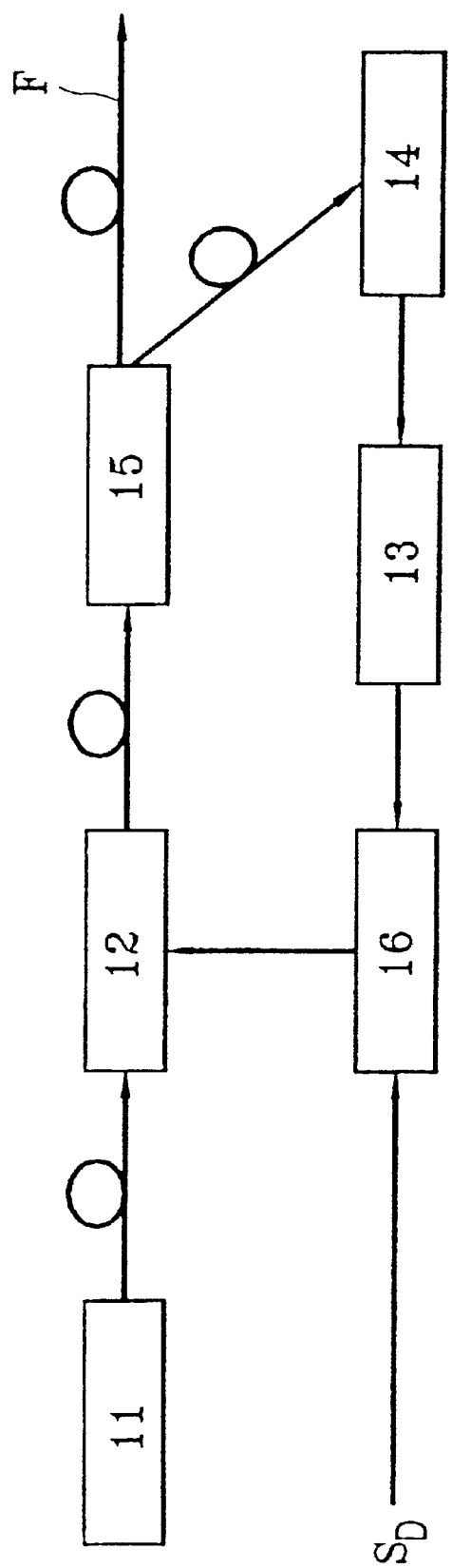
FIG. 3 is a block diagram showing the principle of a system having a light source that is stabilized in frequency by means of a device constituting a possible embodiment of the invention.

FIG. 3 shows that a device 4 of the type described above with reference to FIGS. 1 and 2 is advantageously integrated in a servo-control loop for an oscillator generating a frequency used to modulate an optical signal, in particular in a hybrid transmission system.

The transmission system shown in FIG. 3 comprises:
a laser diode 11;
a modulator 12 which amplitude modulates the optical signal output by said diode 11;
an oscillator 13 which generates a microwave or millimetric electrical signal;
a monitor device 14 similar to the monitor device 4 described with reference to FIGS. 1 and 2, with the signal output by its photodetector being applied to a circuit at the input of the oscillator 13 for correcting the oscillation frequency of said oscillator as a function of said signal;
a coupler 15 which sends the optical signal at the output from the modulator 12 to an optical fiber F for transmission purposes, e.g. towards an emitter unit, and which takes a fraction of this signal to apply it to the monitor device 14; and
a phase modulator 16 having, for example, an input that receives a binary signal corresponding to the encoded data and which phase modulates the electrical signal generated by the oscillator 13, the electrical signal as phase modulated in this way controlling the modulator 12.

When using double-sideband (DSB) modulation, the angle a of the filter means is selected in such a manner that said filter means can detect the frequency difference between the lower sideband and the carrier, and also the frequency difference between the carrier and the upper sideband. It should be observed that these two differences are identical, but correspond to two distinct Bragg gratings on the crystal.

When single-sideband is used, only one Bragg tuning takes place and the angle $\alpha$ of the filter means is selected as a function of the difference between the sideband line and the carrier.

Various embodiments other than that described above can also be envisaged.

In particular, a system for controlling modulation frequency advantageously has two monitor devices of the type described above, each centered on a detection frequency that is offset on a corresponding side of the detection frequency of the system of which the devices form a part.

For example, for a detection frequency of 25 GHz for the control system, the two monitor devices contained therein are centered respectively on 24 GHz and on 26 GHz. The outputs from the photodetectors of these two devices are injected respectively to the two inputs of a differential amplifier. The signal output by the differential amplifier can easily be used in a feedbacks loop for servo-controlling an oscillator on the center frequency of the control system. Such a structure has the advantage of simplifying the electronics of the feedback loop.

What is claimed is:

1. A monitor device for monitoring a modulation frequency of an optical signal, the device being characterized in that it comprises a photorefractive crystal (7), a photodetector (6), and means (8a, 8b, 8c; 9a, 9b, 9c) for applying to said crystal (7) firstly at least a fraction of the modulated optical signal and secondly a write optical signal for photoinducing a Bragg grating on said crystal (7), the orientations of the modulated optical signal and of the write optical signal relative to said crystal (7) being such that at a given wavelength of the optical signal the photodetector (6) detects an intensity for the signal reflected by the crystal (7) that reaches a maximum when the optical signal is modulated at the modulation frequency to be detected.

2. A device according to claim 1, characterized in that it includes means (10) for deriving the write optical signal from the modulated optical signal.

3. A device according to claim 2, characterized in that the write optical signal is a portion of the modulated optical signal.

4. A device according to any preceding claim, characterized in that it has three fiber collimators (8a, 8b, 8c) which are fixed in position relative to said crystal (7) and which are connected respectively one to an optical fiber whereby a portion of the modulated optical signal is applied to the crystal (7), another to an optical fiber whereby the write optical signal is applied to the crystal (7), and the third to an optical fiber whereby the filtered signal as reflected by the crystal (7) is delivered to the photodetector (6).

5. A device according to any preceding claim, characterized in that the crystal (7) is a crystal of InP:Fe.

6. A device for monitoring the modulation frequency of an optical signal modulated at a microwave or millimetric frequency, characterized in that it is constituted by a device according to any preceding claim.

7. A device for monitoring the frequency of an oscillator whose output signal is used for modulating an optical signal, the device being characterized in that it comprises a servo-control loop which comprises:

firstly a monitor device (4) according to any preceding claim receiving as input at least a portion of the optical signal modulated by the oscillator (13); and secondly means for correcting the frequency of the oscillator as a function of the output signal from the photodetector (6) of said monitor device.

8. A hybrid transmission system comprising emitter means (11), modulator means (12) for modulating the signal output by the emitter means (11), an oscillator (13) for generating a microwave or millimetric frequency signal for controlling the modulator means (12), and an optical fiber line on which the modulated signal is transmitted, the system being characterized in that it further comprises a device according to claim 7 for controlling the frequency of the oscillator (13).

9. A system for controlling the modulation frequency of an optical signal, characterized in that it comprises two monitor devices according to any one of claims 1 to 7, centered on respective monitoring frequencies on either side of the modulation frequency that the system is to control, and in that it also comprises a differential amplifier on whose inputs the outputs from the photodetectors of the two monitor devices are injected.

10. A hybrid transmission system comprising emitter means, modulator means for modulating the signal output by the emitter means, an oscillator for generating a microwave or millimetric frequency signal for controlling the modulator means, and an optical fiber line over which the modulated signal is transmitted, the system being characterized in that it further comprises a system according to claim 9 for controlling the frequency of the oscillator.

* * * * *